US008669732B2

(12) United States Patent
Veis et al.

(10) Patent No.: US 8,669,732 B2
(45) Date of Patent: Mar. 11, 2014

(54) ENCODER FOR A PRINTER AND METHOD

(75) Inventors: Alex Veis, Kadima (IL); Yuval Dim, Moshav Haniel (IL)

(73) Assignee: Hewlett-Packard Industrial Printing Ltd., Netanya (IL)

(*) Notice: Subject to any disclaimer, the term of this patent is extended or adjusted under 35 U.S.C. 154(b) by 506 days.

(21) Appl. No.: 12/903,360

(22) Filed: Oct. 13, 2010

(65) Prior Publication Data

US 2012/0092406 A1 Apr. 19, 2012

(51) Int. Cl.
*B41J 29/20* (2006.01)
*G05B 19/29* (2006.01)

(52) U.S. Cl.
USPC .......... 318/602; 347/48

(58) Field of Classification Search
USPC ......... 318/456–458, 461, 602, 605, 661, 558; 347/5, 9, 16, 19, 20, 40, 48, 54, 110, 347/111
See application file for complete search history.

(56) References Cited

U.S. PATENT DOCUMENTS

| | | | | |
|---|---|---|---|---|
| 5,117,374 | A * | 5/1992 | Goetz | 702/150 |
| 5,588,757 | A * | 12/1996 | Unosawa et al. | 400/279 |
| 6,213,659 | B1 | 4/2001 | Elgee | |
| 6,354,691 | B1 * | 3/2002 | Uchikata | 347/37 |
| 6,464,323 | B2 * | 10/2002 | Yokoyama et al. | 347/19 |
| 7,614,718 | B2 | 11/2009 | Chen et al. | |
| 7,686,414 | B2 | 3/2010 | Korem et al. | |
| 2003/0038420 | A1 | 2/2003 | Cleary et al. | |
| 2006/0146106 | A1 * | 7/2006 | Naruse | 347/86 |
| 2007/0248366 | A1 | 10/2007 | Gettelfinger et al. | |
| 2008/0050165 | A1 | 2/2008 | Saito et al. | |
| 2009/0213167 | A1 * | 8/2009 | Motooka et al. | 347/19 |
| 2010/0091303 | A1 | 4/2010 | Brunner et al. | |
| 2011/0050783 | A1 * | 3/2011 | Komuro | 347/20 |

FOREIGN PATENT DOCUMENTS

| | | |
|---|---|---|
| CN | 1853946 | 11/2006 |
| WO | WO-2009056641 | 5/2009 |

* cited by examiner

*Primary Examiner* — Bentsu Ro
(74) *Attorney, Agent, or Firm* — Steven R. Ormiston

(57) ABSTRACT

In one implementation, an encoder assembly for a printer includes: an encoder scale having indicators thereon for determining a printing parameter; an encoder sensor for sensing indicators on the scale; and a mechanism configured to alternately attach an encoder part (either the scale or the sensor) to the substrate and detach the encoder part from the substrate. In another implementation, a method includes: attaching an encoder part to a print substrate, the encoder part being either an encoder scale or an encoder sensor; the sensor sensing indicators on the scale while advancing the substrate with the encoder part attached; and detaching the encoder part from the substrate.

19 Claims, 8 Drawing Sheets

ENCODER FOR A PRINTER AND METHOD

BACKGROUND

Large format inkjet printers print on a variety of different substrates. Large format print substrates include, for example, paper, vinyl and textiles that may be supplied as flexible or rigid pre-cut sheets or rolls of flexible web. Currently, flexible web substrates are more common for large format printing. Some printers handle flexible web substrates up to five meters wide. Large flexible substrates may stretch or otherwise deform as they are moved through the printer, and they may shrink and expand in response to varying temperature and humidity. The irregular and sometimes unpredictable nature of these large flexible substrates may result in improper ink drop placement, thus degrading print quality. It is desirable to monitor the actual position of the substrate as it moves through the printer to allow for corrections to the placement of the ink drops on the substrate to help maintain acceptable print quality.

DRAWINGS

Figure 3:
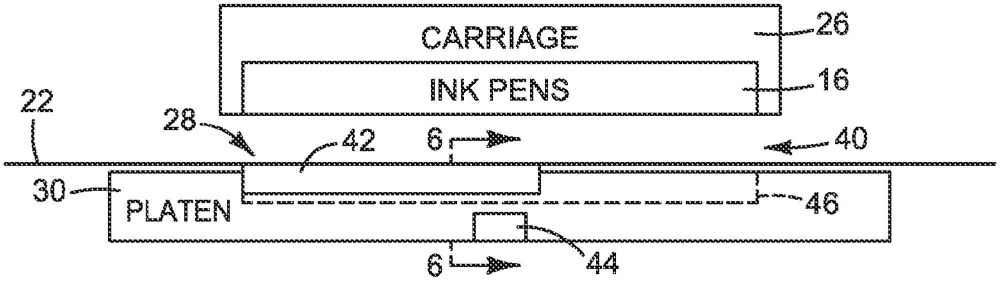
FIGS. 3-5 are diagrammatic elevation views illustrating one example configuration of an encoder assembly, such as the one shown in FIG. 2, in which the encoder assembly is located in a channel in the platen.
Figure 5:
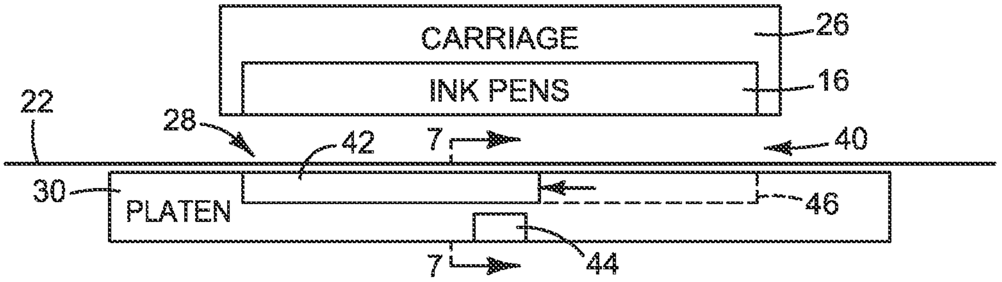
Figure 6:
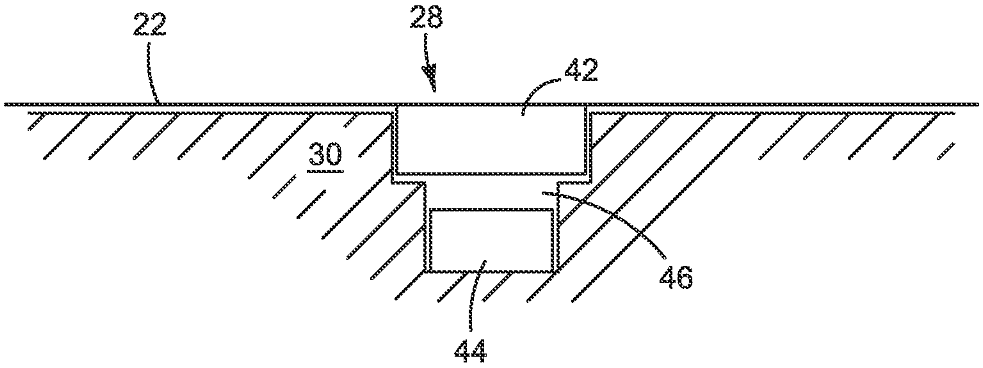
Figure 7:
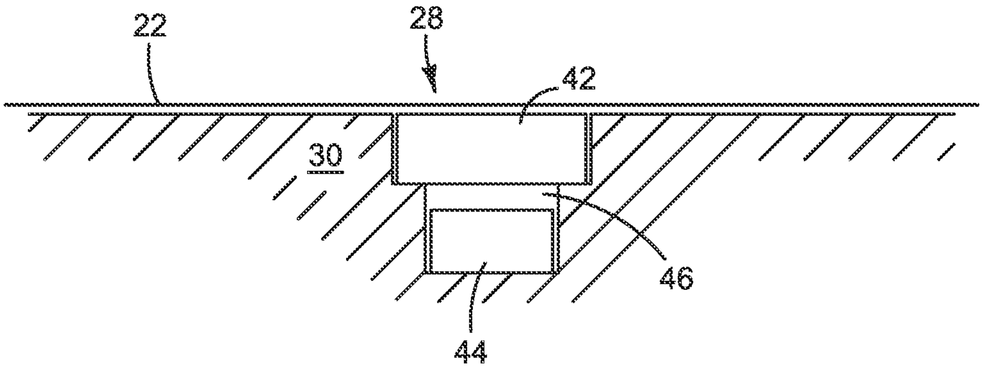

FIGS. 6 and 7 are section views taken along lines 6-6 in FIG. 3 and lines 7-7 in FIG. 5, respectively.

FIGS. 8-11 are enlarged diagrammatic elevation views illustrating one example implementation of an encoder assembly such as that shown in FIGS. 3-7 in which the encoder scale moves with the print substrate and the encoder sensor is stationary.

FIGS. 12-15 are enlarged diagrammatic elevation views illustrating one example implementation of an encoder assembly such as that shown in FIGS. 3-7 in which the encoder sensor moves with the print substrate and the encoder scale is stationary.

Figure 16:
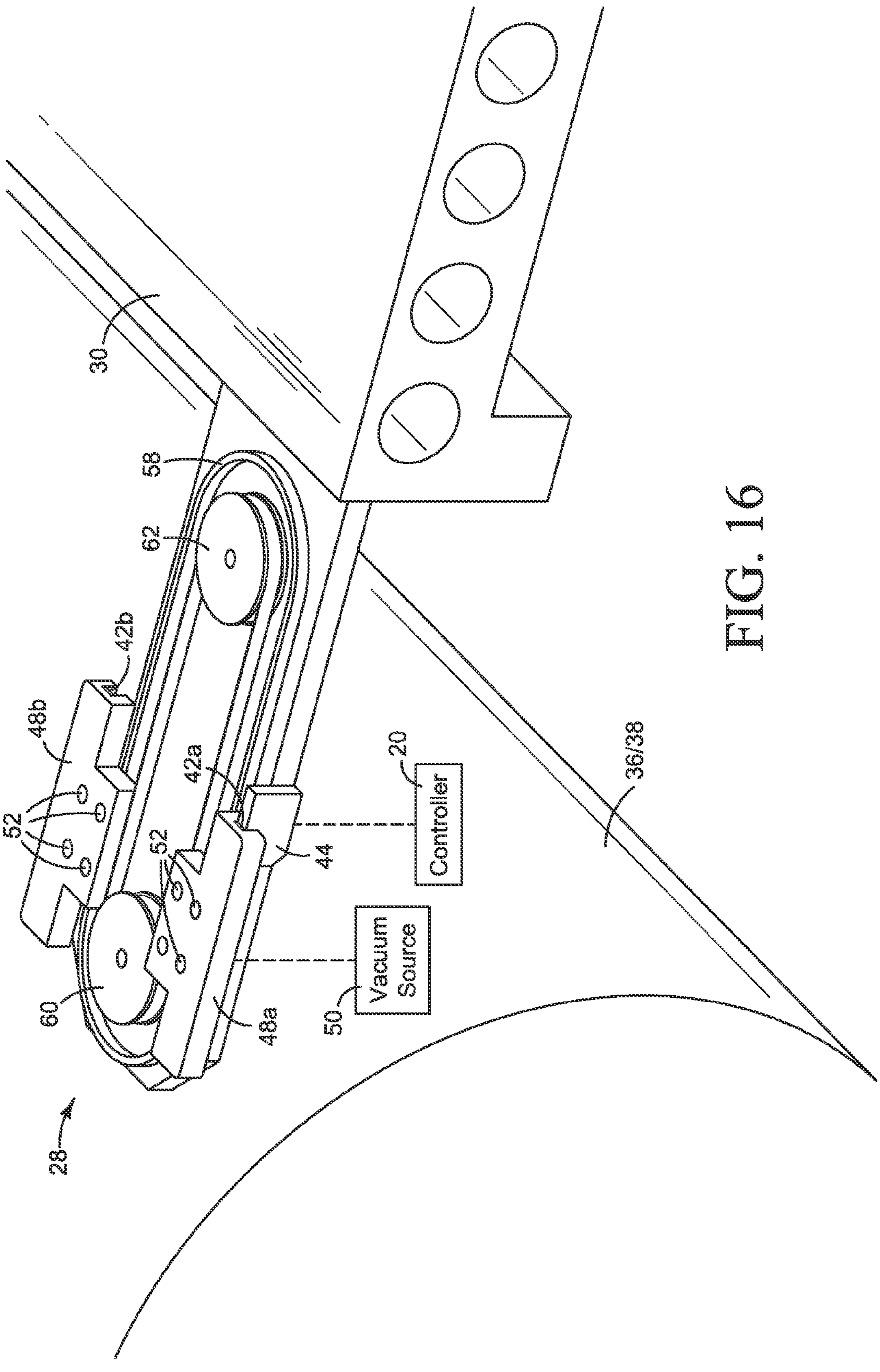

FIG. 16 is a perspective view illustrating an example implementation in which multiple encoder scales alternate moving with the print substrate.

Figure 17:
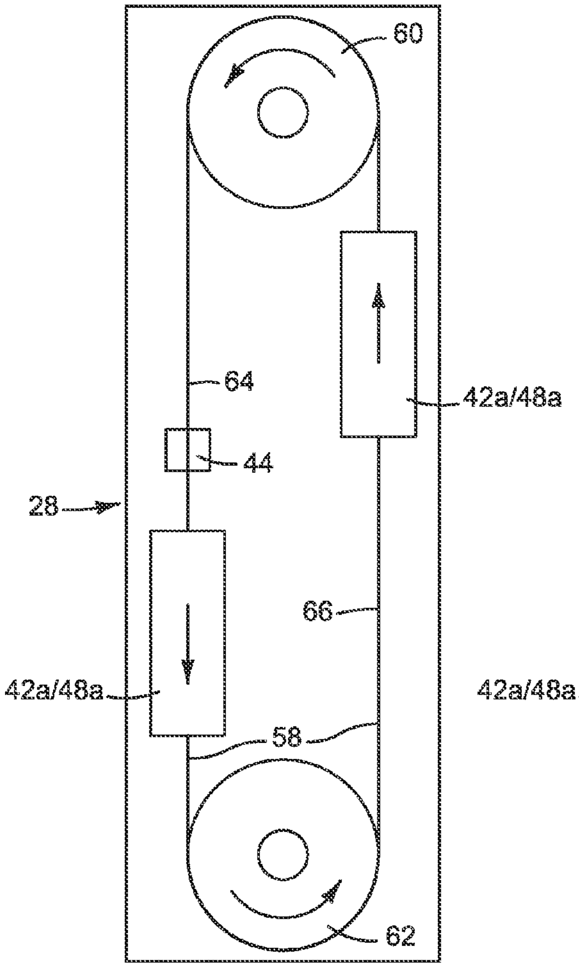
Figure 18:
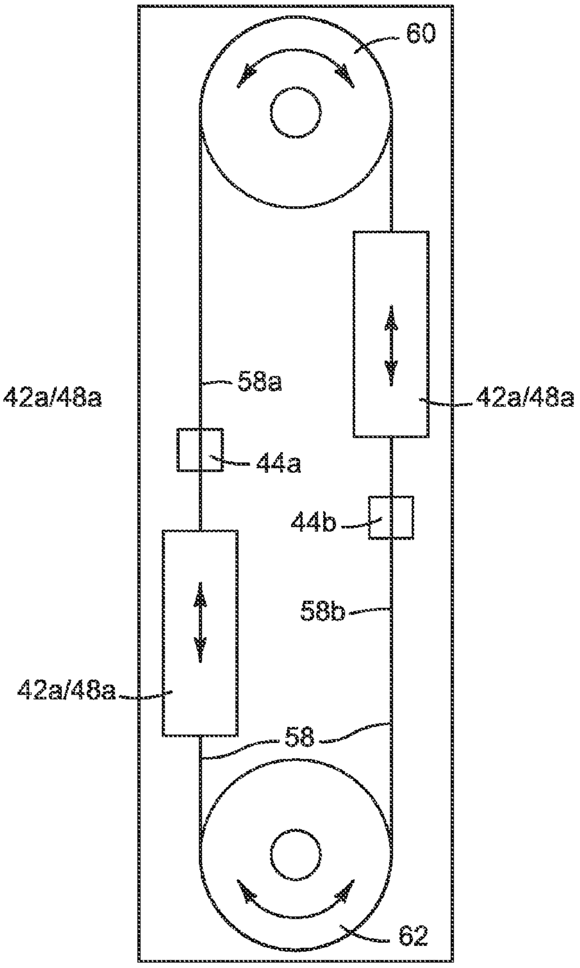

FIGS. 17 and 18 are diagrammatic views illustrating two operating scenarios for the implementation shown in FIG. 16.

Figure 19:
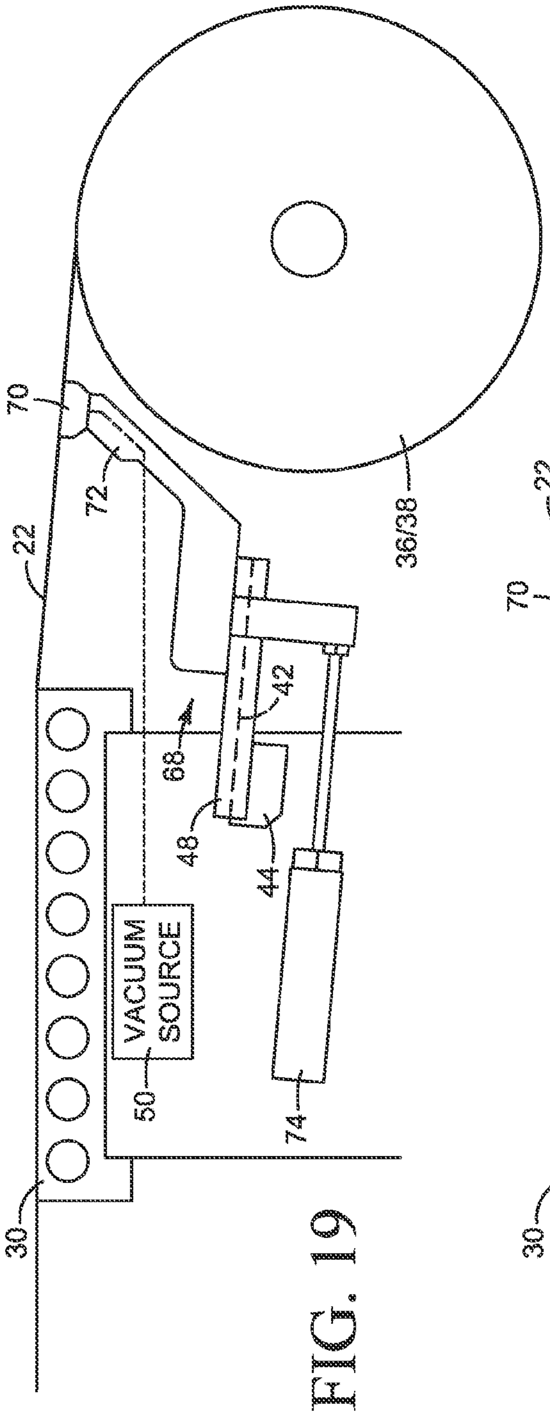
Figure 20:
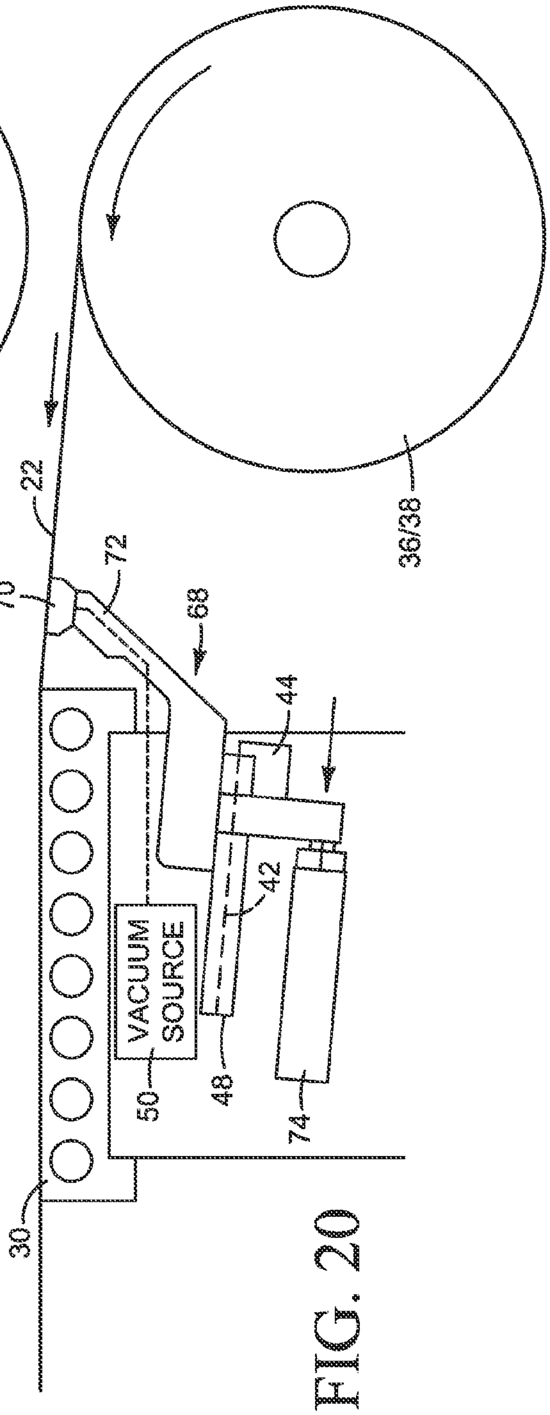

FIGS. 19 and 20 are perspective views illustrating another example implementation in which the encoder scale is attached to the print substrate indirectly through a linkage.

The same part numbers are used to designate the same or similar parts throughout the figures.

DESCRIPTION

Implementations of the new encoder assembly were developed to help accurately monitor the actual position of large format print substrates as they move through the printer, to allow corrections to the placement of the ink drops on the substrate for better print quality. Implementations of the new encoder assembly, however, are not limited to use with large print substrates or large format printers. In one example implementation, one of the encoder parts—either the encoder scale or the encoder sensor—is attached to the substrate. The sensor reads the markings or other indicators on the scale while advancing the substrate with the encoder part attached. The encoder part is then detached from the substrate and returned to a previous position where the process of attaching, sensing and detaching may be repeated to monitor the position of the substrate during printing. The example implementations described below should not be construed to limit the scope of the invention, which is defined in the Claims that follow the Description.

Figure 1:
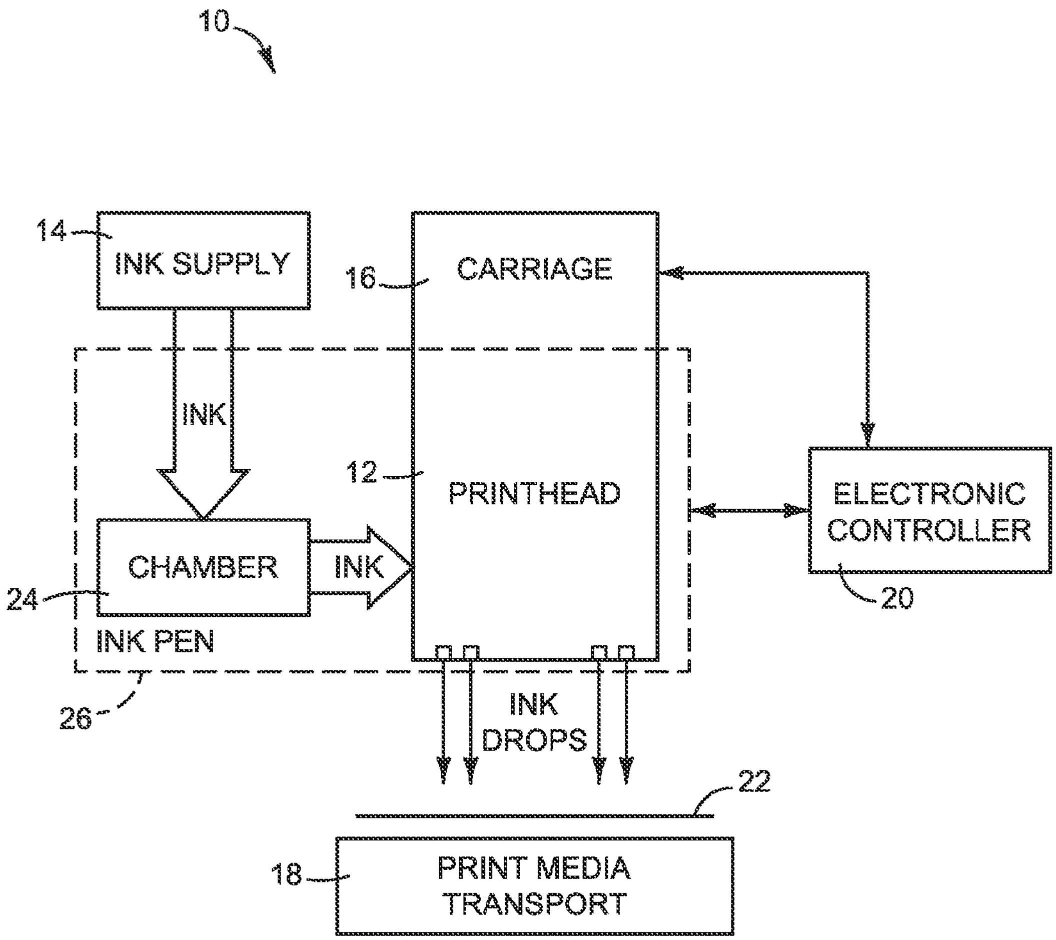
FIG. 1 is a block diagram illustrating one example of an inkjet printer in which implementations of the invention may be used.

FIG. 1 is a block diagram illustrating one example of an inkjet printer 10 in which implementations of the invention may be used. Referring to FIG. 1, inkjet printer 10 includes a printhead 12, an ink supply 14, a carriage 16, a print substrate transport mechanism 18 and a controller 20. Printhead 12 in FIG. 1 represents generally one or more printheads and the associated mechanical and electrical components for dispensing drops of ink on to a sheet or a continuous web of paper or other print substrate 22. Printhead 12 may include one or more stationary printheads that span the width of print substrate 22. Alternatively, printhead 12 may include one or more printheads that scans back and forth on carriage 16 across the width of substrate 22. Printhead 12 may include, for example, thermal ink dispensing elements or piezoelectric ink dispensing elements. Other printhead configurations and ink dispensing elements are possible.

Substrate transport 18 advances print substrate 22 past printhead 12. For a stationary printhead 12, substrate transport 18 may advance substrate 22 continuously past printhead 12. For a scanning printhead 12, substrate transport 18 may advance substrate 22 incrementally past printhead 12, stopping as each swath is printed and then advancing substrate 22 for printing the next swath. Ink chamber 24 and printhead 12 are usually housed together in an ink pen 26, as indicated by the dashed line in FIG. 1. Ink supply 14 supplies ink to printhead 12 through ink chamber 24. Ink supply 14, chamber 24 and printhead 12 may be housed together in an ink pen. Alternatively, ink supply 14 may be housed separate from ink chamber 24 and printhead 12, as shown, in which case ink is supplied to chamber 24 through a flexible tube or other suitable conduit. Printer 10 typically will include several ink pens 26, for example one pen for each of several colors of ink.

Controller 20 in FIG. 1 represents generally the programming, processor(s) and associated memories, and the electronic circuitry and components needed to control the operative elements of printer 10. In a printing operation, controller 20 receives print data and, if necessary, processes that data into printer control information and image data. Controller 20 controls the movement of carriage 16 and substrate transport 18. Controller 20 is electrically connected to printhead 12 to energize the ink dispensing elements to dispense ink drops on to substrate 22. By coordinating the relative position of printhead 12 and substrate 22 with the location of dispensed ink drops, controller 20 produces the desired image on substrate 22 according to the print data.

Figure 2:
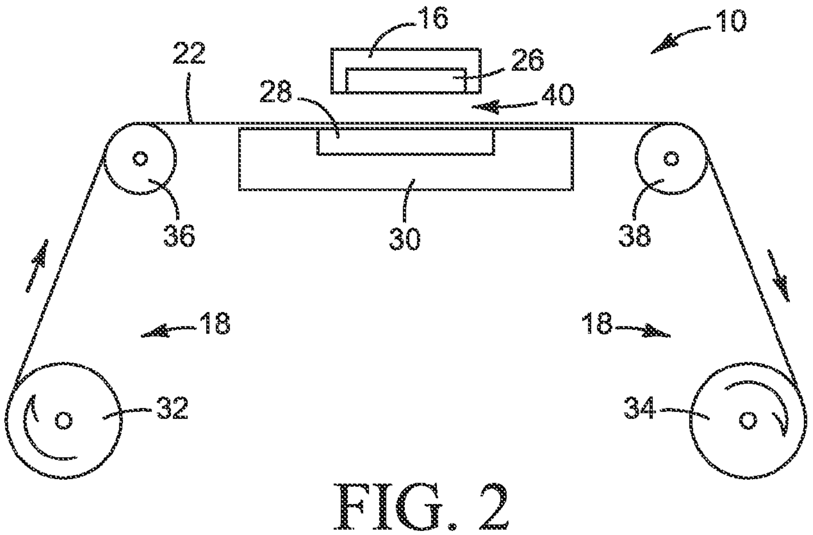
FIG. 2 is a diagrammatic elevation view illustrating a roll-to-roll web printer that includes an encoder assembly according to one implementation of the invention.

FIG. 2 is a diagrammatic elevation view illustrating a roll-to-roll web printer 10 that includes an encoder assembly 28 according to one implementation of the invention. Referring to FIG. 2, printer 10 includes, for example, a group of multiple ink pens 26 for dispensing different color inks. Ink pens 26 are mounted on a carriage 16 over a platen 30. In the example implementation shown in FIG. 2, substrate transport 18 in printer 10 includes a web supply roller 32 and a web take-up roller 34. A web substrate 22 extends from supply roller 32 over platen 30 between intermediate rollers 36 and 38 to take-up roller 32. Intermediate rollers 36 and 38, for example, help control the direction and tension of web 22 through a print zone 40 over platen 30. Pens 26 are scanned back and forth (into and out of the page in FIG. 2) on carriage 16 across the width of substrate 22 as it passes over platen 30 through print zone 40.

Figure 4:
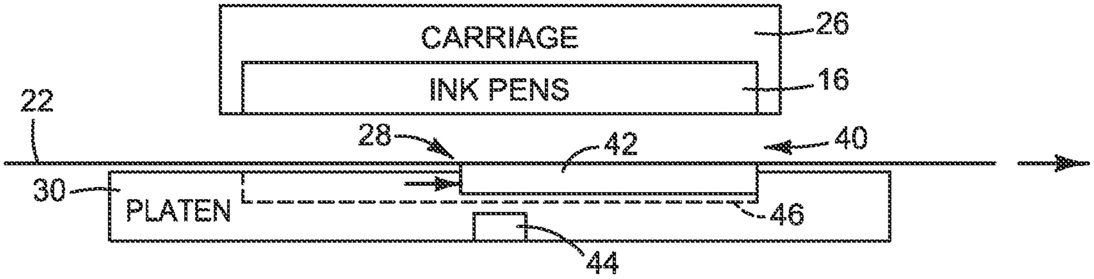

FIGS. 3-5 are enlarged diagrammatic elevation views illustrating one example configuration for encoder assembly 28 in FIG. 2. FIGS. 6 and 7 are section views taken along lines 6-6 in FIG. 3 and lines 7-7 in FIG. 4, respectively. Referring to FIGS. 3-7, encoder assembly 28 includes a movable encoder scale 42 and an encoder sensor 44. As best seen in FIGS. 6 and 7, scale 42 and sensor 44 are located in a channel 46 in platen 30. Sensor 44 is operatively connected to a printer controller, such as controller 20 in FIG. 1. Scale 42 carries markings or other indicators that may be sensed by sensor 44 and used by controller 20 to determine the location, velocity, acceleration or other parameters associated with substrate 22. In operation, encoder scale 42 is attached to substrate 22 as shown in FIGS. 3 and 6. Then, sensor 44 senses the indicators on scale 42 while advancing substrate 22 with scale 42 attached, as best seen by comparing the position of scale 42 in FIGS. 3 and 4. Scale 42 is then detached from substrate 22 as shown in FIGS. 5 and 7 and returned to a previous position, as best seen by comparing the position of scale 42 in FIGS. 4 and 5. The figures depict scale 42 moving up to attach to substrate 22 and moving down to detach from substrate 22 for illustrative purposes only. While scale 42 might move when attached to and detached from substrate 22, such movement is not necessary. In some implementations, such as the implementation described below with reference to FIGS. 8-11, neither scale 42 nor substrate 22 move during attachment and detachment.

The process of attaching, sensing, and detaching may be repeated as desired throughout a printing operation. For a printer 10 in which ink pens 26 are scanned back and forth across substrate 22, scale 42 may be attached to substrate 22 while substrate 22 is stopped for printing a swath as ink pens 26 are scanned across substrate 22. Scale 42 then moves forward with substrate 22 as substrate 22 is positioned for printing the next swath. Scale 42 may be released from substrate 22 and returned to a previous position while substrate 22 is stopped for printing the next swath. Depending on the length and range of travel of scale 42, scale 42 may remain attached to substrate 22 as substrate 22 is advanced for printing multiple swaths. For a printer 10 in which substrate 22 moves continuously past a stationary printhead 12 during printing, scale 42 may be repeatedly attached to and detached from a moving substrate 22.

Different parts of a large flexible substrate 22 may behave in different ways. For example, one part of a substrate 22 may be shrinking while another part along the same printing path may be expanding. Multiple encoder assemblies 28 may be positioned across the width of substrate 22 or positioned at other locations along the length of substrate 22 to help more accurately characterize different parts of the substrate 22. While it is expected that scale 42 will usually be returned to the prior starting position, as shown in FIGS. 3 and 5, scale 42 might be returned to a different starting position. Any suitable encoder technology may be used in encoder assembly 28 including, for example, an optical encoder or a magnetic encoder. Also, encoder scale 42 may include position indicators in two dimensions—across the width of substrate 22 as well as along the length of substrate 22.

Data gathered by sensor(s) 44 may be used by controller 10 to adjust the placement of ink drops on substrate 22 or other printing parameters to improve print quality, for example by adjusting the position of substrate 22 through substrate transport 18 and/or by adjusting the ejection of ink drops through ink pens 26. Drop placement may be adjusted for individual parts of substrate 28 using data from one or more encoder assemblies 28 to compensate for local substrate deformation and to increase local drop placement accuracy.

One example technique for attaching encoder scale 42 to substrate 22 and detaching encoder scale 42 from substrate 22 will now be described with reference to FIGS. 8-11. Referring to FIGS. 8-11, encoder assembly 28 includes a carrier 48 that carries encoder scale 42. In this example implementation, carrier 48 is configured as a vacuum box operatively connected to a pump or other suitable vacuum source 50. Scale 42 is attached to or integrated into the bottom of carrier vacuum box 48. For example, scale 42 may be a reflective scale formed in or attached to the outer surface of the bottom of carrier 48. The top of vacuum box 48 is positioned close to the bottom side of substrate 22. For example, where encoder assembly 28 is positioned in a channel 46 in platen 30, the top of vacuum box 48 may be made flush with the top of platen 30. In the example implementation shown in FIGS. 8-11, vacuum box 48 includes a group of openings 52 along a planar top face 54. Each opening 52 is connected to vacuum source 50 through an interior plenum 56.

Figures 8, 9, 10, 11:
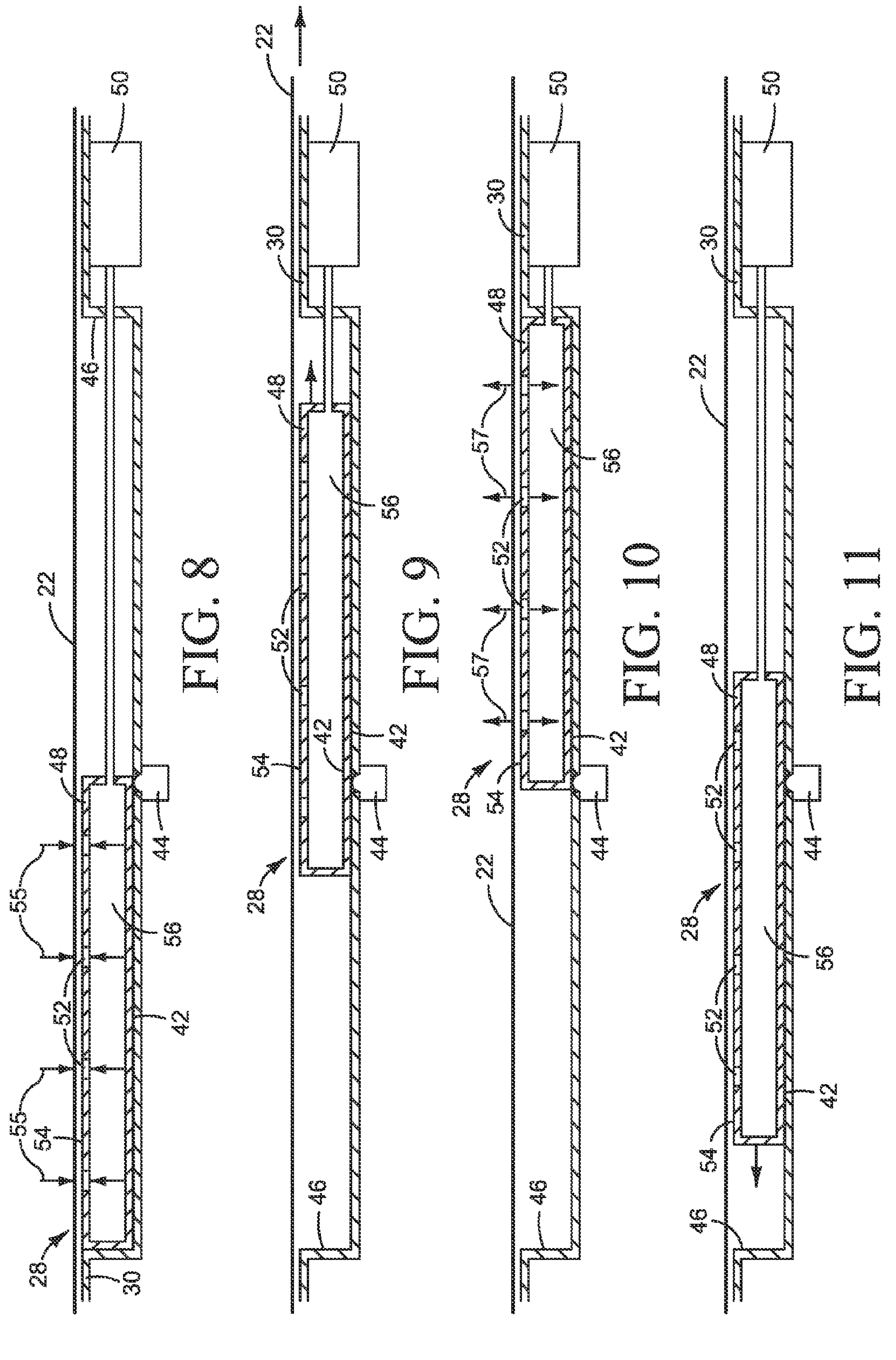
Figure 12:
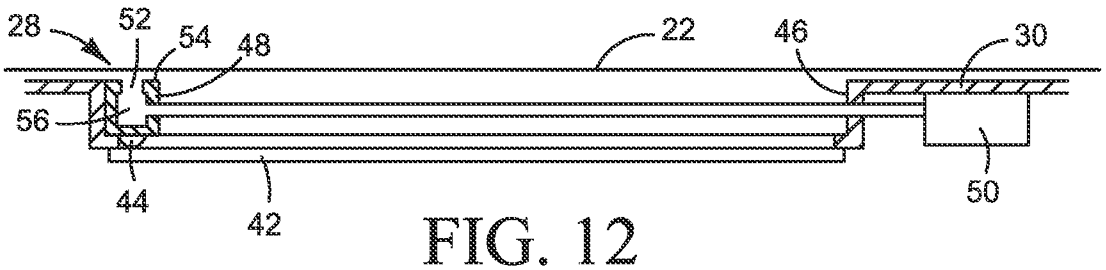

Air is evacuated from plenum 56, and thus from the space between box face 54 and substrate 22, to suck together box 48 and substrate 22 as indicated by arrows 57 in FIG. 8 and attach box 48 and scale 42 to substrate 22. Sufficient suction is applied to create enough friction between substrate 22 and box 48 to allow box 48 to move with substrate 22. It is not necessary that one or both substrate 22 and box 48 move toward or actually contact one another. All that is required is enough suction to cause box face 54 to effectively "stick" to substrate 22.

Sensor 44 reads scale 42 as substrate 22 is advanced through print zone 40 with carrier box 48 attached, as shown in FIG. 9. Carrier box 48 is detached from substrate 22 by releasing the vacuum applied to openings 52, as indicated by arrows 57 in FIG. 10, and returned to a previous position as shown in FIG. 11. In some applications it may be desirable to pressurize plenum 56, and thus the space between box face 54 and substrate 22 to help maintain an air bearing between box face 54 and substrate 22, for example by reversing a vacuum pump 50. The air bearing allows vacuum box 48 and substrate 22 to move freely with respect of one another as box 48 is returned to a starting position as shown in FIG. 11 and as substrate 22 moves over a stationary box 48.

Figure 13:
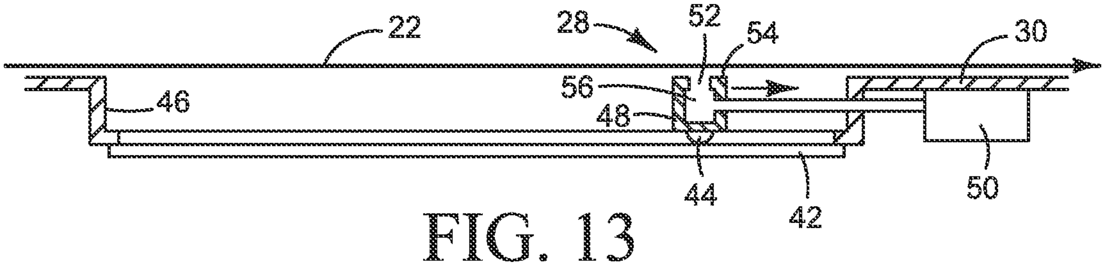
Figure 14:
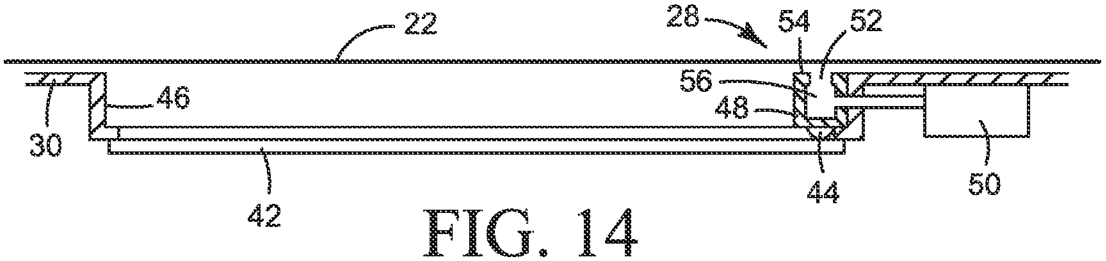
Figure 15:
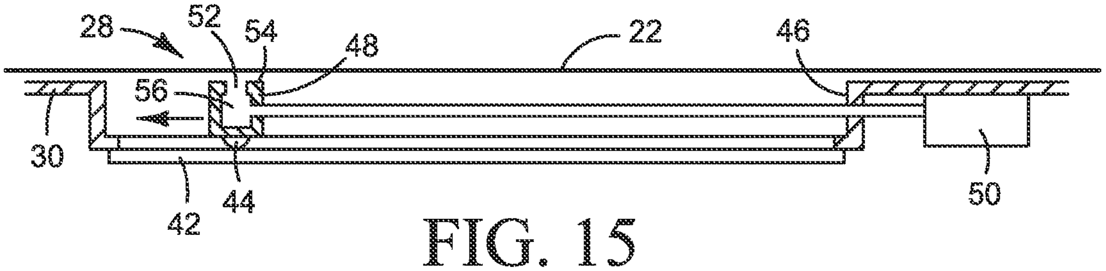

In an alternative implementation shown in FIGS. 12-15, encoder sensor 44 moves with print substrate 22 and encoder scale 42 is stationary. Referring to FIGS. 12-15, in this implementation vacuum box carrier 48 carries encoder sensor 44. Air is evacuated from box 48 to suck together box 48 and substrate 22, thus attaching box 48 and sensor 42 to substrate 22 as described above with reference to FIGS. 8-11. Sensor 44 reads scale 42 as it moves with substrate 22 along scale 42, as shown in FIG. 13. Carrier box 48 is detached from substrate 22 by releasing the vacuum applied to opening(s) 52 and returned to a previous position as shown in FIGS. 14 and 15.

FIG. 16 is a perspective view illustrating an example implementation in which multiple encoder scales 42 alternate moving with print substrate 22. FIGS. 17 and 18 are diagrammatic views illustrating two operating scenarios for the implementation shown in FIG. 16. Referring first to FIG. 16, encoder assembly 28 is positioned between one of the intermediate rollers 36 or 38 and platen 30. Encoder assembly 28 includes two encoder scales 42A and 42B mounted to respective carrier vacuum boxes 48A and 48B. Each box 48A and 48B is mounted on a track 58 opposite one another in a direction across the width of substrate 22.

Referring to FIG. 17, in one operating scenario for encoder assembly 28 in FIG. 16, each scale 42A and 42B is mounted on an oval track 58 that moves in only one direction around rollers 60, 62 to carry each scale 42A and 42B over a single sensor 44. Track 58 includes an advancing part 64 and a returning part 66. In operation, scale 42A on the advancing part 64 of track 58 is attached to and advances with substrate 22 (not shown) past encoder sensor 44 and then is released from substrate 22. While scale 42A is advancing with substrate 22 on advancing part 64, scale 42B is returning along track part 66 toward a starting position on track advancing part 64, where it will become the advancing scale attached to substrate 22 moving past sensor 44. Thus, one scale advances while the other scale returns.

Referring to FIG. 18, in another operating scenario for encoder assembly 28 in FIG. 16, each scale 42A, 42B is mounted on a corresponding track part 58A and 58B, each moving back and forth at the urging of rollers 60, 62 to carry each scale 42A and 42B alternately over respective sensors 44A and 44B. Each track part 58A, 58B advances and returns a scale 42A, 42B. In operation, with rollers 60 and 62 turning clockwise, scale 42A on track part 58A is attached to and advances with substrate 22 (not shown) past encoder sensor 44A and then is released from substrate 22. While scale 42A is advancing with substrate 22 on track part 58A, scale 42B is returning detached from substrate 22 along track part 58B toward a starting position, where it will become the advancing scale attached to substrate 22 moving past sensor 44B when rollers 60 and 62 are reversed to turn counter-clockwise. Thus, one scale advances while the other scale returns.

FIGS. 19 and 20 are perspective views illustrating another example implementation in which encoder scale 42 is attached to print substrate 22 through a linkage 68. Referring to FIGS. 19 and 20, in this implementation, a carrier 48 carrying encoder scale 42 is attached to and detached from substrate 22 through linkage 68. Linkage 68 includes a vacuum box 70 and a connecting arm 72 connecting carrier 48 to vacuum box 70. Vacuum box 48 is positioned close to the bottom side of substrate 22 and operatively connected to a vacuum source 50. In operation, vacuum is applied to box 70 to suck together box 70 and substrate 22 as shown in FIG. 20, thus attaching carrier 48 and scale 42 to substrate 22 indirectly through linkage 68. Vacuum box 70 and scale 42 connected to box 70 moves along with the advancing substrate 22, as best seen by comparing the position of scale 42 in FIGS. 19 and 20, with sensor 46 sensing indicators on the moving scale 42. Then, vacuum to box 70 may be released to detach box 70 and thus scale 42 from substrate 22, and scale 42 returned to the previous position (FIG. 19) at the urging of a pneumatic cylinder 74 or another suitable return mechanism.

As noted above, the example implementations shown in the Figures and described above do not limit the invention. Other implementations are possible. Accordingly, these and other implementations, configurations and details may be made without departing from the spirit and scope of the invention, which is defined in the following claims.

What is claimed is:

1. A method of printing on print substrate by a printer, comprising:

attaching an encoder part for the printer to the print substrate, the encoder part being one of an encoder scale and an encoder sensor, wherein the printer dispenses ink onto the print substrate;

the encoder sensor sensing indicators on the encoder scale while advancing the substrate with the encoder part attached; and detaching the encoder part from the substrate.

2. The method of claim 1, further comprising:

returning the detached encoder part to a previous position; and then repeating the acts of attaching, sensing, and detaching.

3. The method of claim 1, wherein the act of attaching comprises sucking together the encoder part and the substrate.

4. The method of claim 3, wherein the act of detaching comprises releasing the suction between the encoder part and the substrate.

5. The method of claim 1, wherein the act of attaching comprises evacuating a space between the encoder part and the substrate.

6. The method of claim 5, wherein the act of detaching comprises pressurizing the space between the encoder part and the substrate.

7. The method of claim 1, wherein the act of attaching, comprises attaching the encoder part to the substrate through another part.

8. The method of claim 1, further comprising adjusting a printing parameter based on the act of sensing.

9. An encoder assembly for a printer, comprising:

an encoder scale having indicators thereon for determining a printing parameter;

an encoder sensor for sensing indicators on the scale; and a mechanism configured to alternately attach an encoder part to a substrate and detach, the encoder part from the substrate, the encoder part being one of the scale and the sensor, wherein the printer dispenses ink onto the substrate.

10. The assembly of claim 9, wherein the encoder part is the scale.

11. The assembly of claim 9, wherein the encoder part is the sensor.

12. The assembly of claim 9, further comprising a movable carrier carrying the encoder part and wherein the mechanism configured to attach an encoder part to the substrate and detach the encoder part from the substrate comprises the mechanism operatively connected to the carrier and configured to alternately attach the carrier to the substrate and detach the carrier from the substrate.

13. The assembly of claim 12, wherein the carrier and the encoder part are integrated into a single unit.

14. The encoder assembly of claim 12, wherein:

the carrier has a part positioned close to a path along which the substrate moves through the printer; and the mechanism configured to attach an encoder part to the substrate and detach the encoder part from the substrate comprises a vacuum source configured to suck together the carrier part and the substrate so that the carrier is attached to and moves with the substrate and then release the suction so that the carrier part is detached from and does not move with the substrate.

15. The encoder assembly of claim 14, wherein:

the vacuum source configured to suck together the carrier part and the substrate comprises the vacuum source configured to evacuate a space between the carrier and the substrate; and the vacuum source configured to release the suction comprises the vacuum source configured to pressurize the space between the carrier part and the substrate.

16. An encoder assembly for a printer, comprising:

an encoder scale having indicators thereon for determining a position, velocity, acceleration and/or other characteristic;

an encoder sensor for sensing indicators on the scale;

a movable carrier carrying the scale; and a mechanism operatively connected to the carrier and configured to alternately attach the carrier to a print substrate and detach the carrier from the print substrate.

17. The assembly of claim 16, wherein:

the encoder scale comprises multiple encoder scales;

the carrier comprises multiple carriers each carrying one of the scales; and the mechanism is operatively connected to each carrier and configured to attach a first carrier to the print substrate, been detach the first carrier from the print substrate and attach a second carrier to the print substrate, then detach the second carrier from the print substrate, and repeat the acts of attaching and detaching for each of the other carriers if there are more than two carriers.

18. The assembly of claim 16, further comprising a vacuum source and wherein the carrier comprises a vacuum box connected to the vacuum source.

19. The assembly of claim 16, wherein the mechanism comprises vacuum box and a connecting arm connecting the vacuum box to the carrier.

* * * * *

UNITED STATES PATENT AND TRADEMARK OFFICE

CERTIFICATE OF CORRECTION

PATENT NO. : 8,669,732 B2
APPLICATION NO. : 12/903360
DATED : March 11, 2014
INVENTOR(S) : Alex Veis et al.

It is certified that error appears in the above-identified patent and that said Letters Patent is hereby corrected as shown below:

In the Claims

In column 5, line 58, in Claim 1, after “printing on” insert -- a --.

In column 6, line 17, in Claim 7, delete “attaching,” and insert -- attaching --, therefor.

In column 6, line 27, in Claim 9, delete “detach,” and insert -- detach --, therefor.

In column 7, line 10, in Claim 17, delete “been” and insert -- then --, therefor.

In column 7, line 19, in Claim 19, after “comprises” insert -- a --.

Signed and Sealed this
Twenty-fourth Day of June, 2014

Michelle K. Lee

Michelle K. Lee
*Deputy Director of the United States Patent and Trademark Office*